United States Patent Office 3,385,165
Patented May 28, 1968

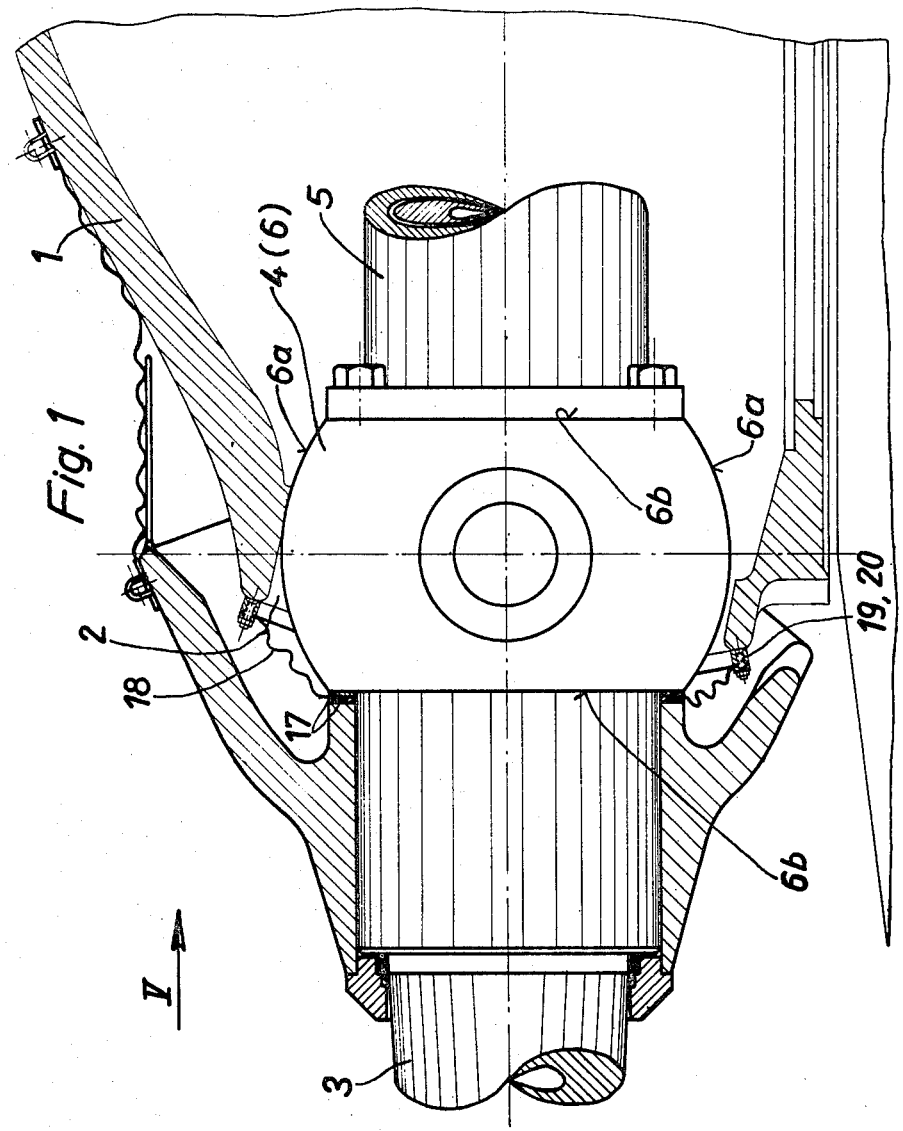

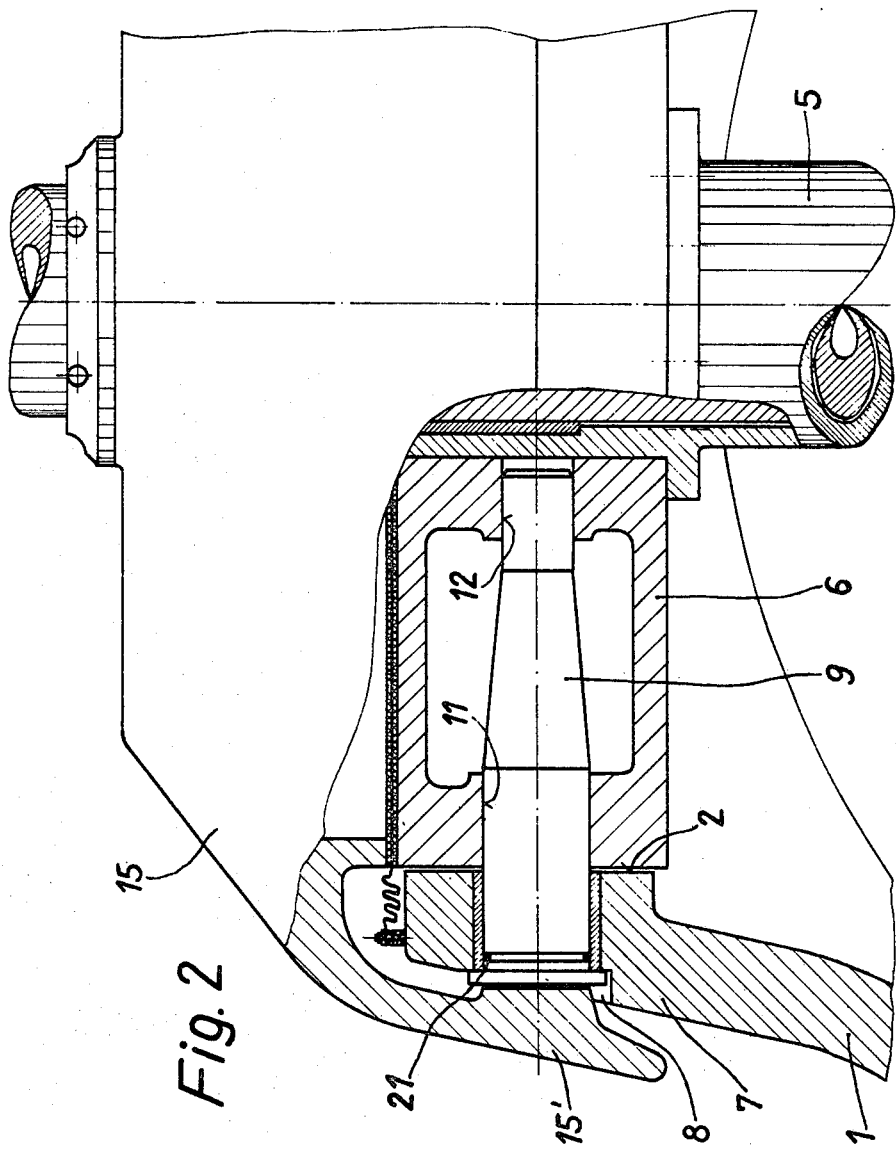

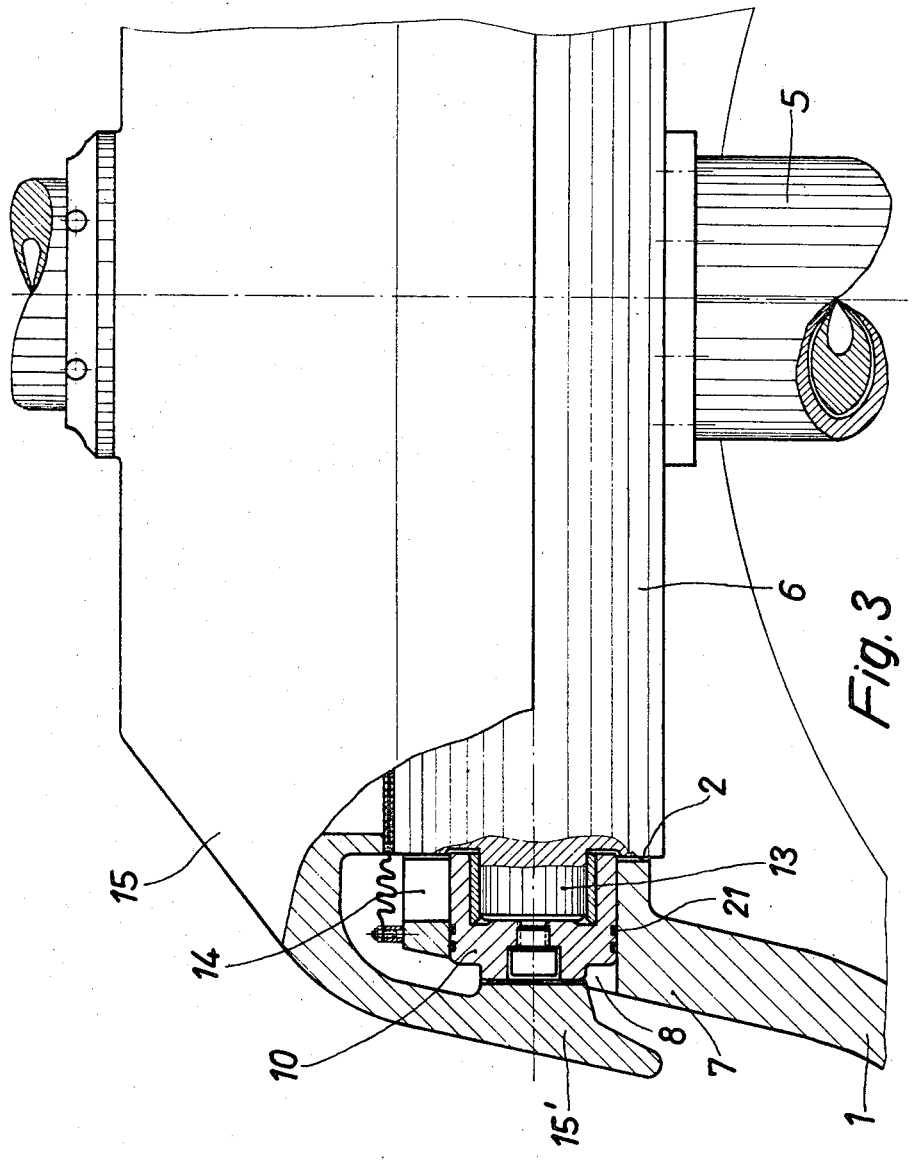

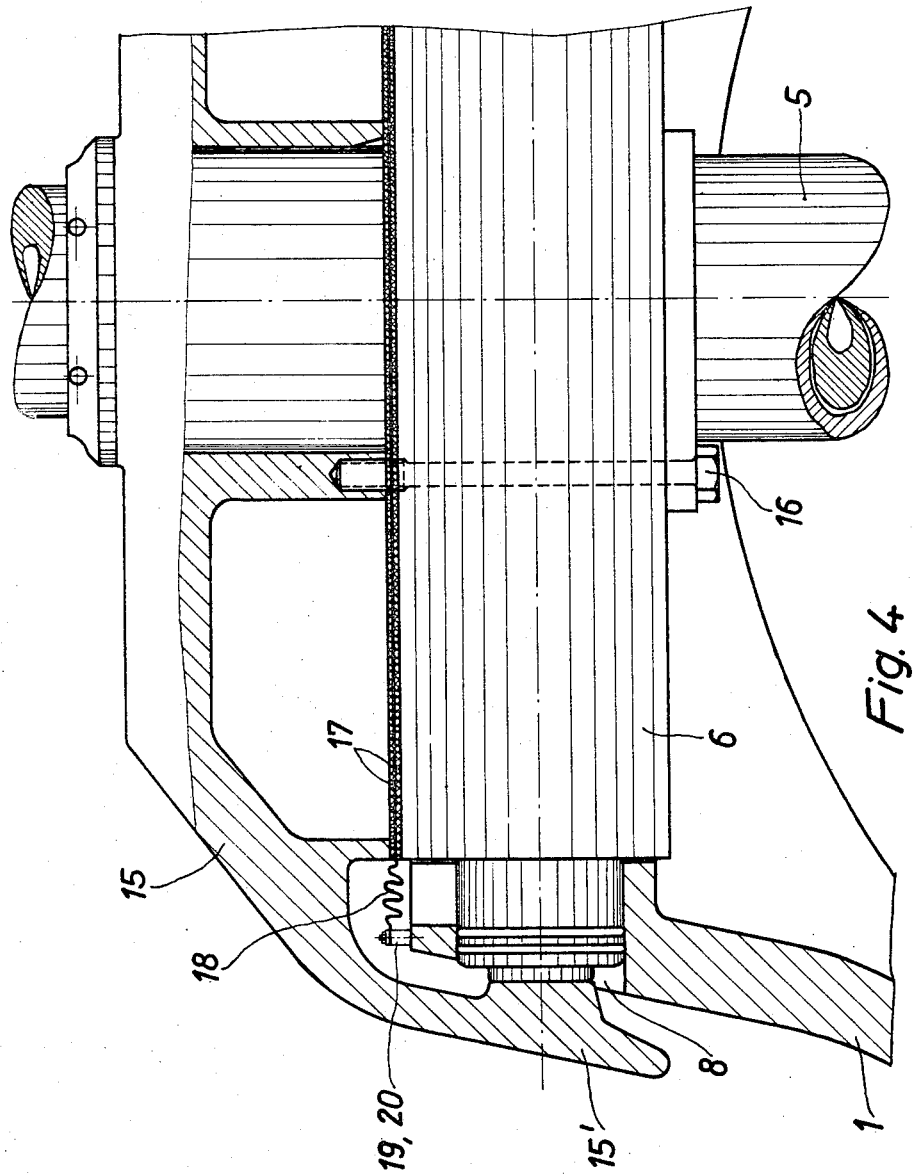

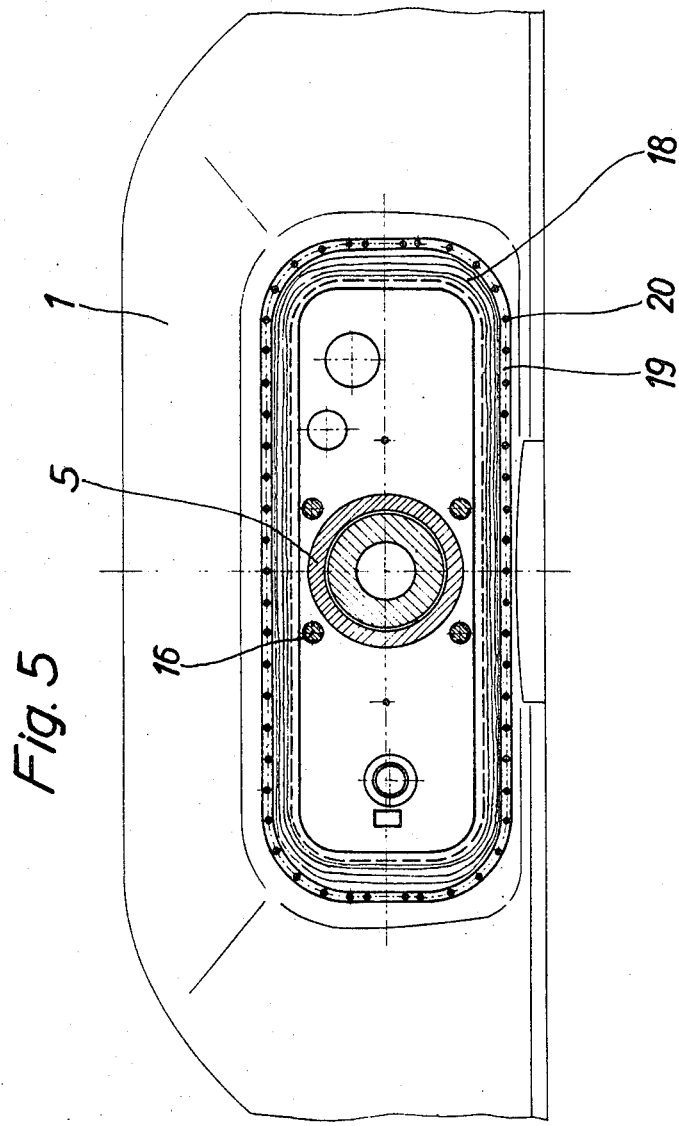

3,385,165
CRADLE MOUNTINGS FOR GUNS IN
ARMORED TURRETS
Otto Hildebrandt, Dusseldorf, and Franz Horn, Osterath (Lower Rhine), Germany, assignors to Firma Rheinmetall G.m.b.H., Dusseldorf, Germany
Filed June 30, 1966, Ser. No. 561,928
Claims priority, application Germany, July 3, 1965, R 41,013
8 Claims. (Cl. 89—37)

ABSTRACT OF THE DISCLOSURE

A gun mounting in an armored turret having a cradle with laterally extending bearing members and an armored turret to receive a gun mounting cradle and bearing members with an armored shield connected to the gun cradle and covering the bearings. A gas and water-tight seal is provided between the turret and pin bearings.

---

This invention relates to cradle mountings for guns in armored turrets, in particular for the turrets of armored vehicles.

An object of the present invention is to provide a space-saving, screwless mounting for a gun cradle, the mounting being additionally protected against bombardment. A further object of the invention is to provide a water-tight and gas-tight mounting, so as to enable the vehicle to travel through water and to prevent ingress of gas into the fighting compartment.

According to the present invention a gun cradle is mounted by means of bearings which can be inserted from the outside of the turret into bores provided in the side walls of the turret, the bearings being protected against artillery fire and secured against axial displacement by an armored shield, the latter being attached to the cradle and covering the bearings. In this way, furthermore, economic advantages are obtained, since the armored shield, being a separate structural part from the gun cradle, simplifies the machining of the cradle and armored shield, and enables the use of a lower grade steel for the cradle than that used for the armored shield.

The bearings advantageously consist of bearing pins which are mounted in the bores in the side walls of the turret and extend into co-axial bores in the cradle body. In this way, a very simple and yet extremely stable mounting is formed, greatly simplifying the fitting of the cradle and the cannon.

In a further embodiment of the invention, instead of the bearings for the cradle consisting of bearing pins, they may consist of bearing bushes which are mounted in the bores in the side walls of the turret and enclose journals provided on the cradle body. This design is advantageous when, in addition to the gun as the main weapon, a smaller auxiliary weapon or other equipment, such as optical sights, is used and, by reason of the arrangement thereof, must be passed through the cradle body.

In a further embodiment of the invention, the cradle consisting of a cradle tube and the cradle cylinder is connected to the armored shield resting on the cradle tube by means of bolts arranged parallel to the axis of the bore of the tube, resilient sheets being interposed between the cylinder and the shield. In this way, a cushioning effect against bombardment is obtained in that the energy of hits on the armored shield is cushioned by the resilient sheets to such an extent that delicate parts arranged on the cradle body, for example optical sights, are protected.

In a further embodiment of the invention, used in combination with a flexible collar known per se, which is secured to the wall of the turret and to the armored shield within the turret opening covered by the shield, very reliable sealing of the interior of the turret against the penetration of water is obtained, so that it is possible to travel through water or use the invention on an amphibious vehicle.

By way of example only, a gun turret incorporating embodiments of the invention will now be described with reference to the accompanying drawings of which:

FIG. 1 is a vertical longitudinal section through the armored turret with the armored shield and the gun cradle, FIG. 2 is a partial horizontal longitudinal section showing an insertable bearing pin, FIG. 3 shows a second construction of the bearing or mounting incorporating insertable bearing bushes, FIG. 4 shows the sealing of the armored shield in relation to the cradle and the turret opening, and FIG. 5 is an elevation along the direction of the arrow V in FIG. 1.

Reference 1 designates the armored turret or the cupola of an armored vehicle, in the opening 2 of which is arranged the gun 3 so that it can be swung in the vertical direction by means of the cradle 4. The cradle consists of the cradle tube 5, in which the gun is slidably carried to allow movement on recoil, and the cradle cylinder 6, a rotatable body having two opposite cylindrical surfaces 6a and two parallel and opposite plane surfaces 6b. The cradle tube 5 and the cradle cylinder 6 are fixedly connected to one another. Provided in the region of the turret opening 2 in the side walls 7 of the turret are bores 8 into which cradle mounting bearings 9 or 10 are inserted from the outside. In the constructional form of the cradle mounting illustrated in FIG. 2, each bearing consists of a bearing pin 9 which is mounted in the bore 8 and extends into co-axial bores 11 and 12 in the cradle cylinder 6.

In the construction according to FIG. 3, the bearing consists of bearing bush 10. This is likewise inserted into the bore 8 from the outside, in such manner that it embraces journal 13 machined on the cradle cylinder. So as to enable the cradle cylinder with the journal 13 to be introduced into the turret opening 2, a suitably dimensioned slot 14 is provided in the side wall 7 of the turret, this slot is closed by the bearing bush 10 when it is inserted.

The bearing bodies 9 and 10 are secured against axial displacement and withdrawal, and are protected against artillery fire by the armored shield 15, which covers the bearing bodies with lateral shields 15'. By means of sealing rings 21, for example O rings, let into the bearing bodies 9 and 10, the mounting is protected against penetration by fumes or water.

The armored shield 15 is supported by the cradle 4. By means of bolts 16 arranged parallel to the axis of the bore of the cradle tube and extending through the cradle cylinder, the cradle tube, the cradle cylinder and the armored shield are fixedly connected to one another. Resilient sheets 17 consisting of resistant plastic are provided between the armored shield and the cradle cylinder. Clamped between the resilient sheets is a flexible collar 18 which covers the free space of the turret opening 2 between the front plane surface of the cradle cylinder and the wall of the turret and is secured to the wall by means of a strip 19 and bolts 20, as a result of which the turret opening is rendered water and gas-tight. The collar is disposed within the space protected by the armored shield, so that damage to the collar is, in practice, eliminated.

We claim:

1. An arrangement for mounting a gun or the like in an armored turret comprising in combination a gun mounting cradle having laterally extending bearing members, an armored turret formed with an orifice to receive the gun mounting cradle and a pair of opposed bores to receive bearings co-operating with the gun mounting cradle bearing members, an armored shield rigidly attached to the gun cradle and covering the bearings, the gun mounting cradle being formed with co-axial internal bearing surfaces engageable with cylindrical pin bearings extending through the opposed bores of the turret, and a gas and water-tight seal between the turret and the cylindrical pin bearings.

2. An arrangement for mounting a gun or the like in an armored turret comprising in combination a gun mounting cradle having laterally extending bearing members, an armored turret formed with an orifice to receive the gun mounting cradle and a pair of opposed bores to receive bearings co-operating with the gun mounting cradle bearing members, an armored shield rigidly attached to the gun cradle and covering the bearings, the gun mounting cradle being formed with journals mounted in bearings inserted into the bores in the turret, and a gas and water-tight seal between the turret and the gun mounting cradle bearings.

3. An arrangement as claimed in claim 1 in which a seal is provided between the turret and the armored shield.

4. An arrangement as claimed in claim 2 in which a seal is provided between the turret and the armored shield.

5. An arrangement as claimed in claim 3 in which the seal comprises an annular flexible collar having one edge secured to the turret and the other edge clamped between the gun mounting cradle and the armored shield, the flexible collar being completely covered by the armored shield.

6. An arrangement as claimed in claim 4 in which the seal comprises an annular flexible collar having one edge secured to the turret and the other edge clamped between the gun mounting cradle and the armored shield, the flexible collar being completely covered by the armored shield.

7. An arrangement as claimed in claim 5 in which a resilient member is clamped between the gun mounting cradle and the armored shield.

8. An arrangement as claimed in claim 6 in which a resilient member is clamped between the gun mounting cradle and the armored shield.

References Cited

UNITED STATES PATENTS

| | | | |
|---|---|---|---|
| 1,352,791 | 9/1920 | Dawson et al. | 89—36 |
| 1,638,435 | 8/1927 | De Courseulles | 89—37 |
| 2,370,148 | 2/1945 | Colby | 89—36 |
| 2,396,073 | 3/1946 | Barnes | 89—36 |
| 3,134,302 | 5/1964 | Horn | 89—36 |

SAMUEL W. ENGLE, *Primary Examiner.*

BENJAMIN A. BORCHELT, *Examiner.*